United States Patent [19]
Wendt

[11] 3,945,741
[45] Mar. 23, 1976

[54] SELF-ALIGNING HANGER ATTACHMENT BRACKET FOR STRUCTURAL STEEL JOISTS

[75] Inventor: Alan C. Wendt, Barrington, Ill.

[73] Assignee: United States Gypsum Company, Chicago, Ill.

[22] Filed: Jan. 6, 1975

[21] Appl. No.: 538,693

[52] U.S. Cl.................................. 403/232; 52/751
[51] Int. Cl.² ........................................... F16B 5/00
[58] Field of Search....... 403/231, 232; 52/751, 752

[56] References Cited
UNITED STATES PATENTS

| 666,918 | 1/1901 | Butz | 52/751 |
| 2,700,457 | 1/1955 | Munroe | 52/752 X |
| 3,633,950 | 1/1972 | Gilb | 52/751 |
| 3,752,512 | 8/1973 | Gilb | 52/751 |

FOREIGN PATENTS OR APPLICATIONS

| 105,169 | 6/1924 | Switzerland | 403/231 |

*Primary Examiner*—Andrew V. Kundrat
*Attorney, Agent, or Firm*—Donnie Rudd; Stanton T. Hadley; Samuel Kurlandsky

[57] ABSTRACT

A hanger for mounting hollow metal joists perpendicular to headers and the like is disclosed. The hanger has a U-shaped top flange for hanging the hanger and a backplate suspended from the hanger with the backplate terminating at its bottom edge in a saddle for the joist to rest upon and with the backplate being bent outward and together at its upper portion to provide a support for the interior of the hollow metal joist.

2 Claims, 5 Drawing Figures

SELF-ALIGNING HANGER ATTACHMENT BRACKET FOR STRUCTURAL STEEL JOISTS

BACKGROUND OF THE INVENTION

1. Field of the Invention

This invention relates to a hanger for mounting hollow metal joists perpendicular to headers and the like. The hanger has a U-shaped top flange at the upper portion with the U-shaped top flange supporting a backplate which terminates at its bottom portion in a saddle and which is bent outward and spaced together at its top portion to form a support on which the hollow metal joist can be supported.

2. Description of the Prior Art

Many types of saddle hangers have heretofore been produced. These saddle hangers generally have the same approach to design. They each have some type of grip at the top of the hanger for attaching the hanger to a header or the like. The grip can be simply a straight portion, an L-shaped lip or plurality of U-shaped lips for encircling or partially encircling the header for attachment thereto. In conjunction with the grip, these types of hangers have a backplate which is terminated in a saddle arrangement at the bottom thereof generally by folding the bottom outward and then folding the sides outward followed by folding the bottom around the sides and attaching it thereto to form the saddle arrangement. Other methods of construction include those in which the bottom is first bent outward and severed from the side portions which are then bent outward and around the bottom of the bottom portion to form a saddle. Still other embodiments are those in which a single member is bent on its ends to form U-shaped portions and then bent outward away from the header so that the middle portion of the single member forms a saddle. These prior designs for hangers all have one feature in common, the entire weight of the joist is supported by the saddle. While this sometimes provides an acceptable method for attaching the joist to a header, it does have the problem of not providiing sufficient strength to support the joist. More importantly, however, it also presents the problem of not permitting the required stability when the hanger must be in exact alignment in order to have exact alignment of the hollow metal joist with respect to the header.

The present invention overcomes each of the problems associated with the prior art in providing a hanger which can be used for perfect alignment of the joist with respect to the header and also for providing additional support for the hollow metal joist in this hanging-type arrangement.

SUMMARY OF THE INVENTION

It is an object of this invention to provide a hanger for mounting hollow metal joists perpendicular to headers and the like.

It is another object of this invention to provide a hanger for mounting hollow metal joists perpendicular to headers and the like wherein exact alignment of the joist with respect to the header is accomplished by a single installer.

It is still another object of this invenion to provide a hanger for mounting hollow metal joists perpendicular to headers and the like wherein the hanger provides for support in addition to the support conventionally provided by standard saddle-type hangers.

It is another object of this invention to provide a method for making a hanger for mounting hollow metal joists perpendicular to headers and the like.

It is a still further object of this invention to provide a method for mounting hollow metal joists perpendicular to headers and the like.

The objects of this invention are accomplished in a hanger for mounting metal joists perpendicular to headers and the like, including a U-shaped top flange for hanging the hanger and a backplate suspended from the top flange with said backplate having side flanges extending outward therefrom and said slide flanges being connnected at the bottom edge to form a saddle for the joist, by the improvement comprising: divided side flanges forming a top and bottom portion of the side flanges, and the spacing of the top portions of the side flanges closer together, whereby a joist resting on the saddle and attached to the side flanges also rests on the top of the top portions of the side flanges for additional support.

The objects of this invention are further accomplished in a hanger for mounting hollow metal joists perpendicular to headers and the like, including a U-shaped top flange for hanging the hanger, a backplate attached to the hanger for attachment to the header, and a saddle formed as an extension of the bottom of the backplate, by the improvement comprising: peeled outward tops of the backplate with said peeled outward tops spaced together a distance no greater than the inside dimension of the hollow joist to be supported thereon, whereby a joist supported in the saddle is also supported by the peeled outward tops of the backplate.

The objects of this invention are further accomplished by a method for making a hanger for mounting hollow metal joists perpendicular to headers and the like, said method comprising: forming the upper portion of a backplate into a U-shaped top flange for hanging the hanger; forming the lower portion of the backplate into side flanges terminated at the bottom in a saddle; and folding outward and spacing together the upper portions of the backplate to provide additional supports for the upper inside portion of a hollow metal joist mounted on the hanger.

The objects of this invention are additionally accomplished by a method for mounting hollow metal joists perpendicular to headers and the like, said method comprising: hanging the U-shaped top flange of a hanger having a backplate terminated on the upper portion by the U-shaped top flange over a header; simultaneously resting the hollow metal joist on spaced together upper portions of the backplate and on a saddle formed by the backplate; and attaching the hanger to the joist and header.

It may be seen that the hanger of this invention, although simple, constitutes a significant advancement in the design of hangers for attaching metal joists perpendicular to headers and the like. Not only does the hanger provide for exact alignment, both of the top and bottom of the metal joist with respect to the header, but as well provides for additional support of the metal joist other than the support provided by the saddle at the bottom of the hanger. This additional support is tremendously impotant in providing additional load-bearing ability resulting in a construction significantly advanced over anything heretofore known.

BRIEF DESCRIPTION OF THE DRAWINGS

This invention may be more fully described but is not limited by the attached drawings in which.

DESCRIPTION OF THE PREFERRED EMBODIMENTS

Figure 1:
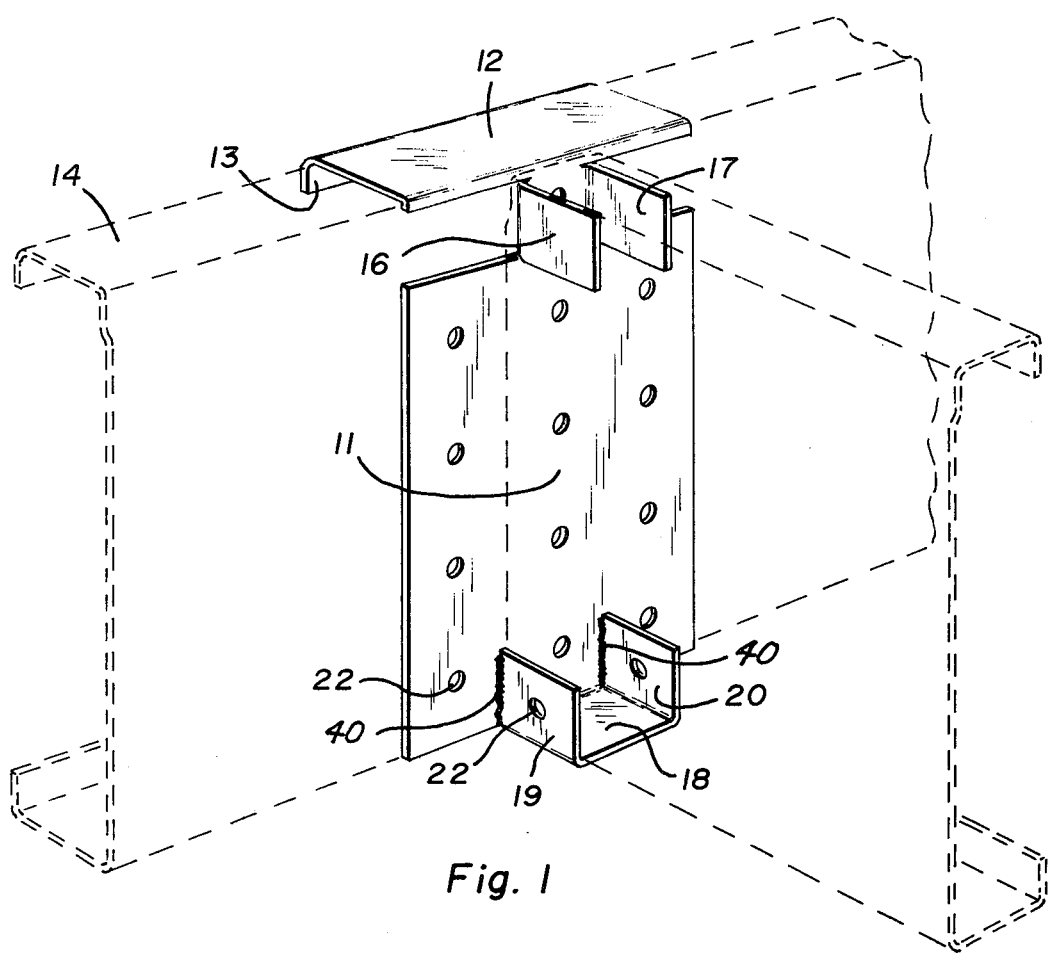
FIG. 1 is a perspective view of the hanger of this invention with the hollow metal joist and header shown in phantom.
Figure 2:
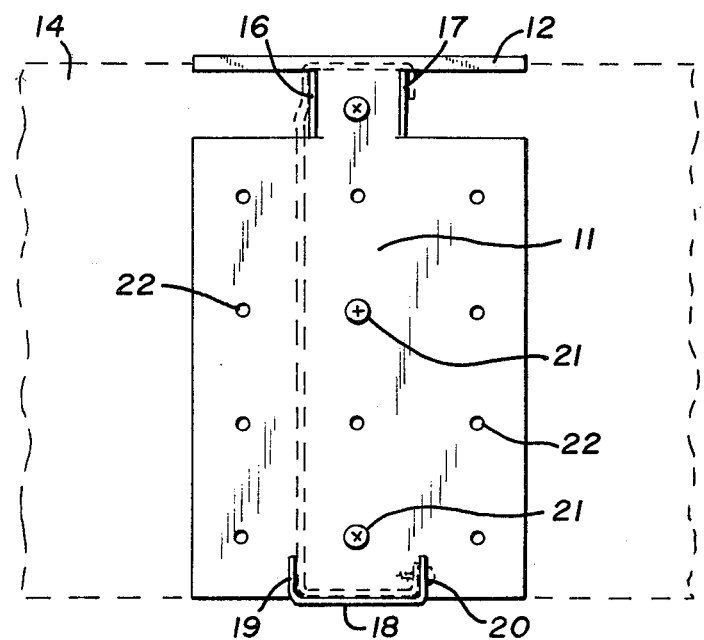
FIG. 2 is a front view of the hanger shown in FIG. 1.

In the drawings, numeral 11 refers to the backplate of the hanger of this invention. The backplate terminates at its upper portion in a horizontal member 12, which is folded over forming a descending vertical portion 13, making the upper portion thereof in the design of the U-shaped top flange. This U-shaped top flange fits over the header 14 or the stud 15, each shown in phantom. The backplate can be formed in several alternative embodiments to fall within this invention. In one embodiment of this invention, as shown in FIGS. 1 and 2, the upper portions 16 and 17 of the backplate are peeled outward and spaced close enough together to engage the inner upper portion of the hollow metal joist. The bottom portion of the backplate is folded outward forming horizontal portion 18, and then folded upward to form flanges 19 and 20, which are attached to the backplate by welding 40 or any other suitable manner thereby creating a saddle which can hold the lower outside portion of the hollow metal joist. In this embodiment of the invention, the hollow metal joist is slipped onto the upper portion of the hanger and into the saddle and then the hanger is hung over the header, or else the hanger is first hung over the header and then the joist appropriately slipped into the hanger. In each case the hanger may be secured to both the header and the joist by any appropriate method, such as screws 21 through holes 22. It is not necessary that the attachment method be by screws, however, and any appropriate well-known means of attachment may be utilized.

Figure 3:
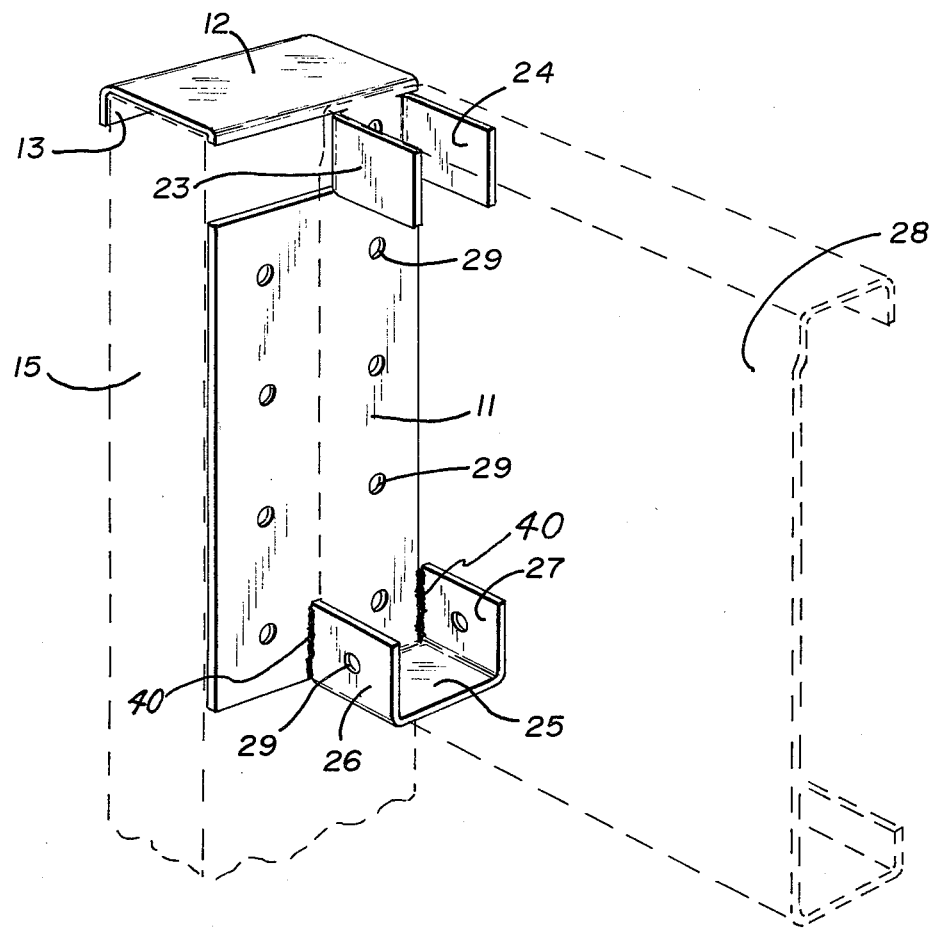
FIG. 3 is a perspective view of an alternative embodiment of the hanger of this ivention wherein the hanger is used for mounting a joist to a door header or the like with the header and joist shown in phantom.

In still another embodiment of this invention, disclosed in FIG. 3, the upper portion of backplate 11 of the hanger is terminated in horizontal portion 12, with downward portion 13 forming the U-shaped top flange for hanging over the top of a stud 15, shown in phantom. Upper portions of the backplate 23 and 24 are bent outward and spaced together a distance sufficient to accommodate the inside of the hollow metal joint. The bottom of the hanger is then bent outward to form horizontal portion 25 and then bent upward to form flanges 26 and 27, which are attached to the backplate by welding 40 or any suitable manner thereby creating the saddle arrangement at the bottom of the hanger. The remaining portion of one side of the backplate is then severed away from the remaining portion of the backplate in order to provide a one plane termination of the entire assembly thereby making it possible for the assembly to be used as a door header or the like. In this embodiment, the hollow metal joist 28, shown in phantom, is slipped into the top of the hanger and also into the saddle of the hanger and the hanger then placed on top of the stud, or else the hanger is placed on the stud and the hollow metal joist engaged appropriately therein. The hollow metal joist may be attachd as shown or may be reversed so that the open portion of the "C" shape faces the other direction, depending on desired installation features. Accordingly, the hanger is again attached to both the hollow metal joist and stud through an appropriate attachment such as in screws attached through holes 29.

Figure 4:
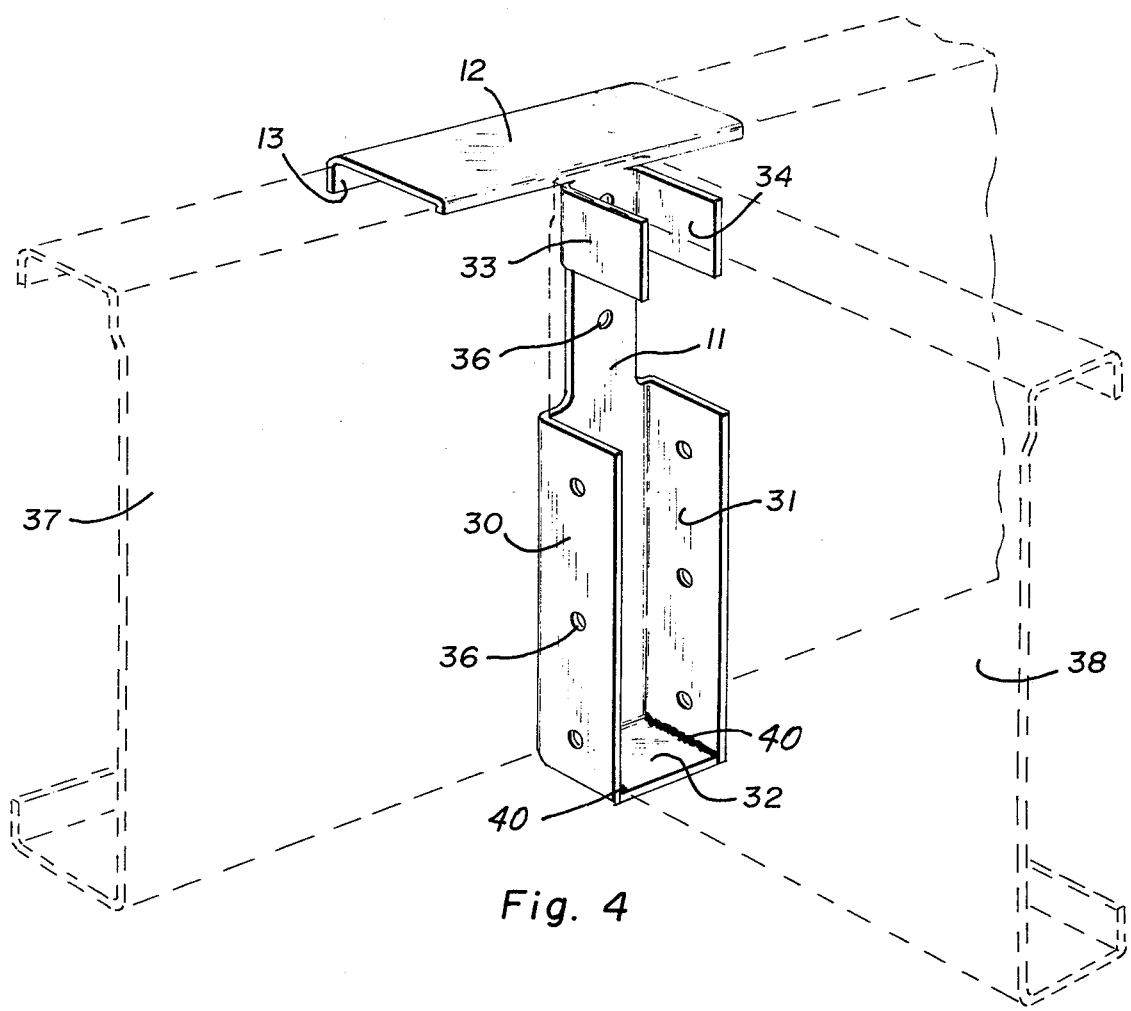
FIG. 4 is a perspective view of an alternative embodiment of the hanger of this invention with the hollow metal joist and header shown in phantom.
Figure 5:
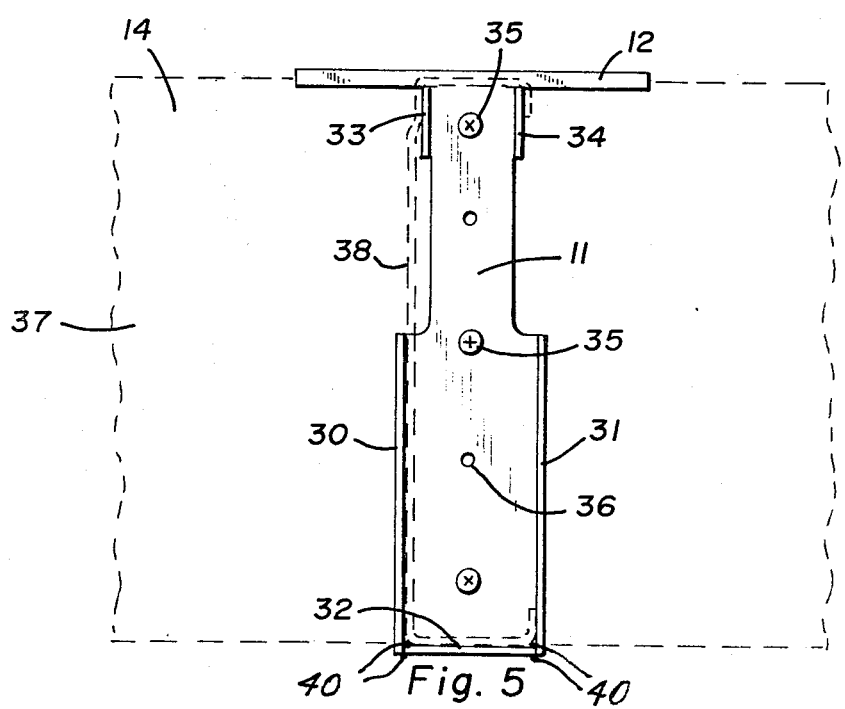
FIG. 5 is a front view of the hanger shown in FIG. 4.

Still another embodiment of this invention is shown in FIGS. 4 and 5 of the drawings. This embodiment of the invention is similar to that shown in FIGS. 1 and 2 with the exception that the backplate is formed outward in long extensions to form side flanges 30 and 31, which are firmly attached to the bottom horizontal portion 32, by welding 40, to form long side flanges terminating in a long saddle arrangement. Extra portions of the backplate are severed therefrom leaving a gap between the saddle and the upper arms 33 and 34 which are used to engage the upper portion of the hollow metal joist. Additionally, the mid portion of the side flange is not required to be severed but may simply be divided and the top portions thereof moved closer together. Again, the hanger may be attached to the hollow metal joist 38 shown in phantom and header 37, also shown in phantom, by any appropriate means such as, for instance, screws 35 attached through holes 36. The method of attachment of this hanger is the same as the method described with relation to the other embodiments of the hanger.

It may be seen that this invention constitutes a new and novel advancement in the design of hangers for attaching hollow metal joists perpendicular to headers and the like. The hanger provides for additional support of the hollow metal joist and also provides for exact alignment of the hollow metal joist with relation to the header or stud or the like. This new advancement in the design of hanger makes possible the installation of the joist with respect to the header by one person rather than requiring one person to hold the joist and hanger while another person makes the alignment and attachment. In addition, this hanger provides an additional means of support for the upper portion of the hollow metal joist rather than placing full reliance for support on the saddle and screws. This elimination of manpower along with the exactness of alignment and increased supportive strength provided by this hanger represents a significant advance in the construction industry.

Having fully described this new and unique invention, the following is claimed:

1. In a hanger for mounting hollow metal joists perpendicular to headers and the like, including a U-shaped top flange for hanging the hanger and a backplate suspended from the top flange with said backplate having side flanges extending outward therefrom and said side flanges being connected at the bottom edge to form a saddle for the joist, the improvement comprising: divided side flanges forming a top and bottom portion of the side flanges, and the spacing of the top portions of the side flanges closer together, a hollow joist resting on the saddle and attached to the side flanges and encompassing the top of the top portions of the side flanges for additional support.

2. In a hanger for mounting hollow metal joists perpendicular to headers and the like, including a U-shaped top flange for hanging the hanger, a backplate depending from the hanger for attachment to the header, and a saddle formed as an extension of the bottom of the backplate, the improvement comprising: peeled outward tops of the backplate with said peeled outward tops spaced together a distance no greater than the inside dimension of the hollow joist to be supported thereon, a hollow joist supported in the saddle and encompassing the peeled outward tops of the backplate.

* * * * *

UNITED STATES PATENT OFFICE
CERTIFICATE OF CORRECTION

Patent No. 3,945,741           Dated March 23, 1976

Inventor(s) Alan C. Wendt

It is certified that error appears in the above-identified patent and that said Letters Patent are hereby corrected as shown below:

Column 1, Line 16 delete "portion to be attached"; Column 1, Line 17 delete "to the header, or else a U-shaped lip or"; Column 1, Line 23 insert after L-shaped --portion to be attached to the header, or else a U-shaped--; Column 1, Line 44, "providiing" should read --providing--.
   In Column 2, Line 66 "impotant" should read --important--.
   In Column 3, Line 56 "joint" should read --joist--.

Signed and Sealed this eighth Day of June 1976

[SEAL]

Attest:

RUTH C. MASON
*Attesting Officer*

C. MARSHALL DANN
*Commissioner of Patents and Trademarks*